(12) United States Patent
Shimada

(10) Patent No.: US 7,889,378 B2
(45) Date of Patent: Feb. 15, 2011

(54) IMAGE PROCESSING WITH LOG MANAGEMENT

(75) Inventor: Bungo Shimada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1300 days.

(21) Appl. No.: 11/441,032

(22) Filed: May 26, 2006

(65) Prior Publication Data

US 2006/0279764 A1 Dec. 14, 2006

(30) Foreign Application Priority Data

Jun. 9, 2005 (JP) ............................. 2005-170049

(51) Int. Cl.
*G06K 15/00* (2006.01)
*G06F 3/12* (2006.01)

(52) U.S. Cl. ..................................... 358/1.16; 358/1.14

(58) Field of Classification Search ................ 358/1.1, 358/1.12, 1.13, 1.15, 447, 497, 1.14, 1.16; 399/8, 9, 10, 16

See application file for complete search history.

(56) References Cited

U.S. PATENT DOCUMENTS

| | | | | |
|---|---|---|---|---|
| 4,673,990 A | * | 6/1987 | Okada | 358/296 |
| 6,570,667 B1 | * | 5/2003 | Hattori et al. | 358/1.15 |
| 2004/0117389 A1 | * | 6/2004 | Enami et al. | 707/100 |
| 2010/0067038 A1 | * | 3/2010 | Aoki | 358/1.14 |

FOREIGN PATENT DOCUMENTS

| | | |
|---|---|---|
| JP | 6-268791 | 9/1994 |
| JP | 08-167983 | 6/1996 |
| JP | 11-045031 | 2/1999 |
| JP | 2001-094748 | 4/2001 |
| JP | 2002-057895 | 2/2002 |
| JP | 2003-143384 | 5/2003 |
| JP | 2004-208048 | 7/2004 |
| JP | 2004-229127 | 8/2004 |
| JP | 2004-363834 | 12/2004 |

OTHER PUBLICATIONS

Office Action dated Jul. 27, 2009 in Japanese Counterpart Application No. 2005-170049.

* cited by examiner

*Primary Examiner* — Gabriel I Garcia
(74) *Attorney, Agent, or Firm* — Fitzpatrick, Cella, Harper & Scinto

(57) ABSTRACT

In an image processing system for executing a job for an image, when security recording processing for an image to be processed is set valid, the image and the information related to a job to be executed for the image are stored in a predetermined unit. The state of storage processing of the image is monitored to prohibit the execution of the job for the image until storage processing of the image is completed.

3 Claims, 12 Drawing Sheets

FIG. 4

| | TAG NAME | ITEM | EXAMPLE 1 |
|---|---|---|---|
| 4001 | JobKind | JOB KIND | PDL-PRINT |
| 4002 | JobName | JOB NAME | Word-Document |
| 4003 | ClientName | JOB CLIENT | SUZUKI Hajime |
| 4004 | CharacterCode | CHARACTER CODE INFORMATION | Shift_JIS |
| 4005 | SectionNo | SECTION CODE | 1054 |
| 4006 | StartTime | JOB START TIME (COMMUNICATION START TIME) | 2004/10/15 08:05:40 |
| 4007 | EndTime | JOB END TIME (COMMUNICATION END TIME) | 2004/10/15 08:10:30 |
| 4008 | Result | JOB END RESULT | OK |
| 4009 | ResourceCount | PAGE COUNT FOR ONE COPY | 10 |
| 4010 | Copies | COPY COUNT | 5 |
| 4011 | Protocol | COMMUNICATION METHOD | LPR |
| 4012 | ComType | COMMUNICATION TYPE | — |
| 4013 | LineInfo | LINE NUMBER IN USE | — |
| 4014 | NoticeAddress | TRANSMISSION (RECEPTION) PARTNER DEVICE ADDRESS, TELEPHONE NUMBER | — |
| 4015 | ComAbbreviation | TRANSMISSION (RECEPTION) PARTNER DEVICE NAME | — |
| 4016 | Subject | SUBJECT | — |
| 4017 | PathName | IMAGE PATH NAME (IMAGE STORAGE DESTINATION INFORMATION) | — |
| 4018 | DeviceName | DEVICE NAME | CENTER-MFP5 |
| 4019 | DeviceSerialNo | DEVICE SERIAL NUMBER | MKJJ001234 |
| 4020 | DeviceAddress | DEVICE ADDRESS | 88.125.9.45 |
| 4021 | DocumentID | DOCUMENT ID | MKJJ0012340410150805400000001589 |
| 4022 | JobInformation | JOB DETAILED INFORMATION | FORM-COMPOSITION |

FIG. 5

|  | EXAMPLE 1 | EXAMPLE 2 |
|---|---|---|
| 5001 | I-FAX | FAX |
| 5002 | — | — |
| 5003 | — | TACHIBANA Akira |
| 5004 | Shift_JIS | Shift_JIS |
| 5005 | — | 0332 |
| 5006 | 2004 / 10 / 16  20 : 10 : 22 | 2004 / 10 / 16  21 : 10 : 24 |
| 5007 | 2004 / 10 / 16  20 : 11 : 30 | 2004 / 10 / 16  21 : 15 : 30 |
| 5008 | Canceled | OK |
| 5009 | 1 | 4 |
| 5010 | 1 | 1 |
| 5011 | I-FAX | FAXG3 |
| 5012 | Receive | Send |
| 5013 | — | 0447336111 |
| 5014 | xxxyyy@zzzcompany.com | 0337582111 |
| 5015 | Thomas Anderson | Head Office |
| 5016 | Shipping document | — |
| 5017 | /IFAX/HOME/05/ | — |
| 5018 | CENTER-MFP5 | CENTER-MFP5 |
| 5019 | MKJJ001234 | MMJJ001234 |
| 5020 | 88.125.9.45 | 88.125.9.45 |
| 5021 | MKJJ00123404101620102200000001592 | MKJJ00123404101621102400000001593 |
| 5022 | — | — |

IMAGE PROCESSING WITH LOG MANAGEMENT

FIELD OF THE INVENTION

The present invention relates to a log management and, more particularly, to an image processing system and image processing method of managing image data input/output to/from an image processing apparatus.

BACKGROUND OF THE INVENTION

Along with the prevalence of image processing apparatuses, anyone can easily copy and transmit a document. However, although such easy copying and transmission improve the user's convenience, they also pose a significant problem in terms of leakage of information such as copying and transmission of a secret document and the like.

To solve this problem, an image processing apparatus which stores all read image data, printed image data, and transmitted image data in a recording device upon copying or transmission, and records information about the time, place, user, and contents of processing of the image data is available (e.g., see Japanese Patent Laid-Open No. 6-268791). With such technique, the following effect can be obtained. The administrator can investigate or track down the image processing apparatus which processed the document the information of which has been leaked, by checking the image data of interest.

However, in the conventional image processing apparatus described above, since an image is transmitted or printed before being completely stored in the recording device, the image to be investigated or tracked down later is not always completely stored when a sudden power down or a full capacity state of the recording device has occurred.

SUMMARY OF THE INVENTION

The present invention has been made in consideration of the above situation, and has as its object to provide an image processing system and image processing method of completely recording input/output image data and its associated information in a predetermined unit so that a proper track down can be performed later even when failures of various types occur.

In order to achieve the above object, an image processing system according to the present invention is characterized by mainly comprising the following arrangement.

An image processing system comprising:

an authentication unit adapted to authenticate a user who is allowed to instruct a job execution;

an execution unit adapted to execute, in response to a job execution instruction of a user authenticated by the authentication unit, a job in which image data is input or output;

a storage unit adapted to store in a storage device the image data in correspondence with information related to the job, apart from executing the job;

a monitor unit adapted to monitor a state of storage processing of the image data by the storage unit;

a prohibition unit adapted to prohibit execution of a job for the image data until storage processing of the image data by the storage unit is completed; and an invalidation unit adapted to invalidate a prohibition operation by the prohibition unit when the job is based on an instruction of a specific user authenticated by the authentication unit.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of a log record to be stored in the storage server 1005 in the image processing system according to the first embodiment of the present invention;

FIG. 5 is a table showing another example of the log record to be stored in the storage server 1005 in the image processing system according to the first embodiment of the present invention;

DETAILED DESCRIPTION OF THE PREFERRED EMBODIMENTS

Preferred embodiments of the present invention will now be described in detail in accordance with the accompanying drawings.

An image processing system according to an embodiment of the present invention will be described hereinafter with reference to the accompanying drawings.

First Embodiment

Figure 1:
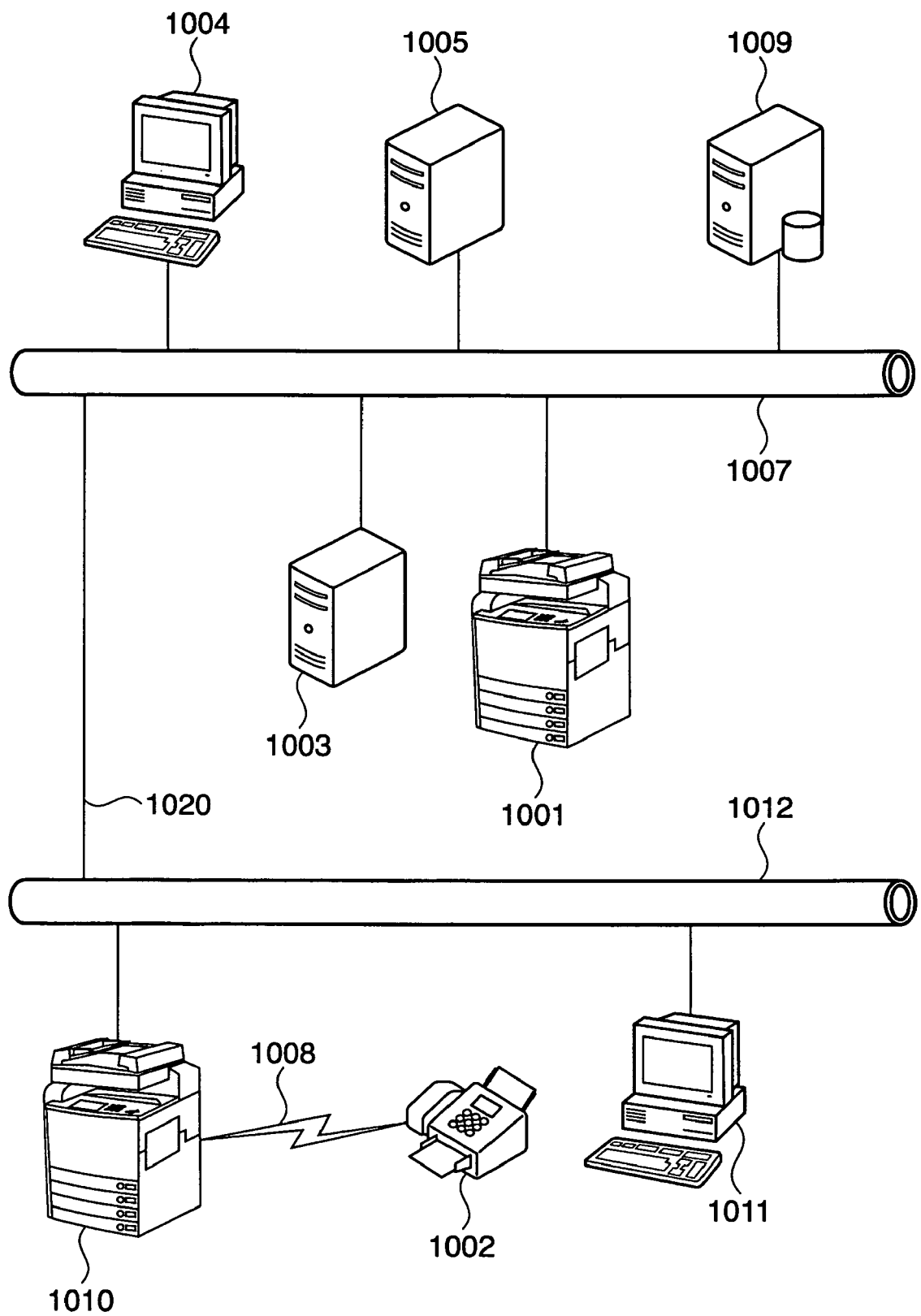
FIG. 1 is a diagram showing the arrangement of a basic image processing system according to the first embodiment of the present invention.

FIG. 1 is a diagram showing the arrangement of a basic image processing system according to the first embodiment of the present invention. In FIG. 1, a multifunctional peripheral 1001 as an example of an image processing apparatus is a device comprising multiple functions of reading a document, copying and printing the document, transmitting an image to various devices, and receiving an image from various devices. A database/mail server 1003 is a computer on which an application server for storing data read by the multifunctional peripheral 1001 is running. A client computer 1004 is a computer which connects to the database/mail server 1003 to download and display the stored data. The client computer 1004 can send a required print instruction to the multifunctional peripheral 1001.

In FIG. 1, a storage server 1005 is a monitor storage device for recording and storing image data input and output in execution of jobs of various kinds by the multifunctional peripheral 1001, together with the detailed information (i.e., associated information) of a job in which the image data is input and output. The storage server 1005 records and manages the detailed information of a job as a log record. A chasing server 1009 is a server which acquires and stores data from the storage server 1005. As the image processing system shown in FIG. 1, when a chasing server is arranged in the environment in which a plurality of multifunctional peripherals and storage servers are present, data required for the security management can be integrally managed. If OCR processing is performed for the image acquired by the chasing server 1009 and a specific keyword is detected, an e-mail or the like can be sent to notify the system administrator of the possibility of an information leakage. Note that the relationship between the storage server 1005 and chasing server 1009 is not limited to that described above. For example, recording contents may be shared such that the storage server 1005 records image data and the chasing server 1009 records a log record. In addition, these two servers may be integrated into one server.

A network 1007 is a network such as Ethernet® to which the multifunctional peripheral 1001, database/mail server 1003, client computer 1004, storage server 1005, and chasing server 1009 are connected.

In FIG. 1, a multifunctional peripheral 1010 is a device for reading a document, copying or printing the document, and transmitting an image to various devices. The multifunctional peripheral 1010 includes the same functions as those of the storage server 1005. The multifunctional peripheral 1010 comprises a monitor storage device for recording and storing all image data input/output to/from the multifunctional peripheral 1001 together with the detailed information of a job in which the image data is input/output.

A client computer 1011 connects to the multifunctional peripheral 1010 to send a printout instruction or IFAX (Internet FAX) instruction. A network 1012 is a network such as Ethernet® to which the multifunctional peripheral 1010 and client computer 1011 are connected. A facsimile apparatus 1002 receives data read by the multifunctional peripheral 1010 via a public network 1008 to print the received data. The facsimile apparatus 1002 can transmit image data to the multifunctional peripheral 1010 via the public network 1008. The networks 1007 and 1012 such as Ethernet® are interconnected by a WAN (Wide Area Network) 1020.

Figure 2:
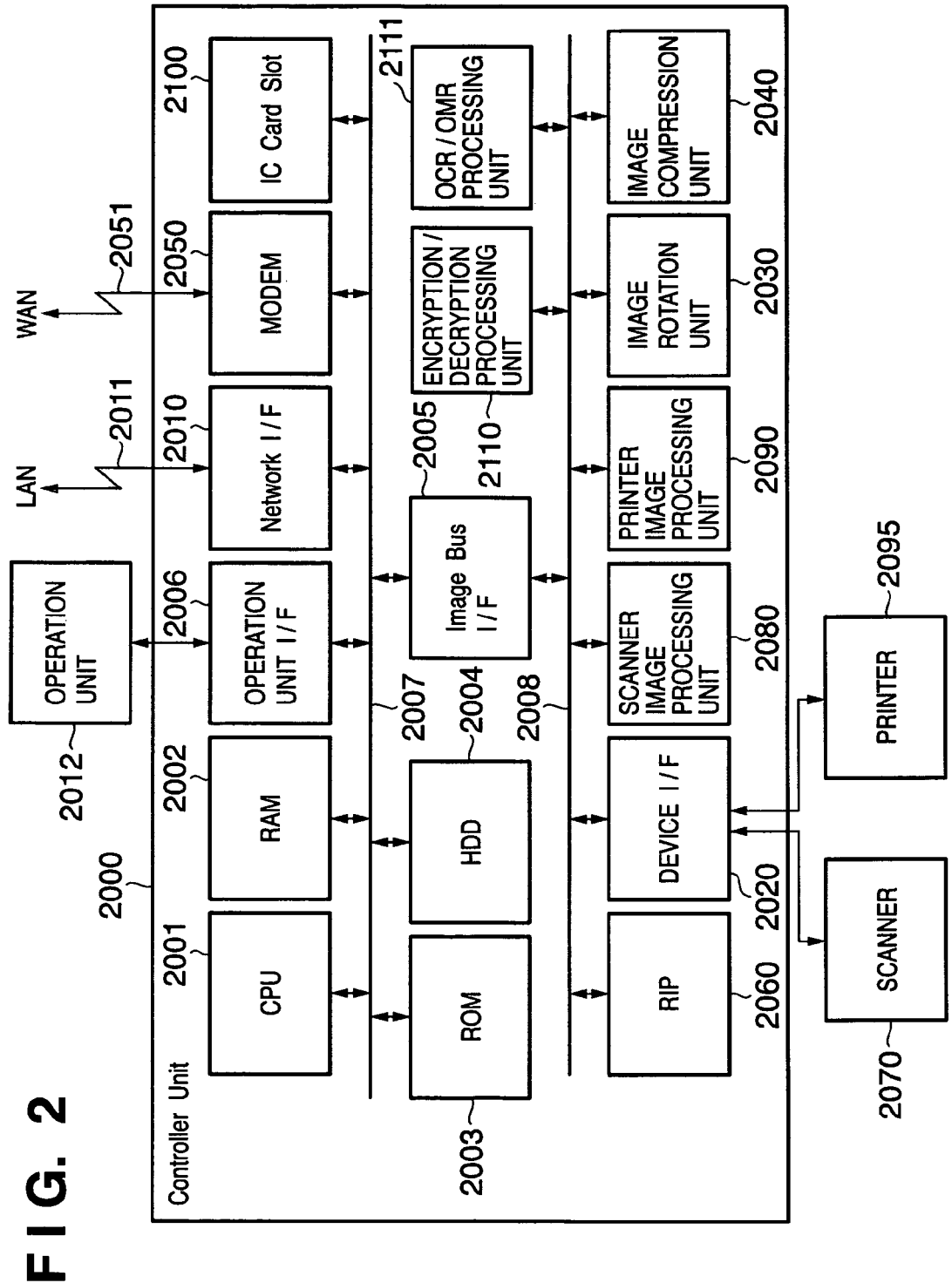
FIG. 2 is a system block diagram of an image input/output device according to the first embodiment of the present invention.

FIG. 2 is a system block diagram of an image input/output device according to the first embodiment of the present invention. The system is mounted in, e.g., the multifunctional peripherals 1001 and 1010.

In FIG. 2, a controller unit 2000 is a controller which connects to a scanner 2070 as an image input device and a printer 2095 as an image output device on one side, and to a LAN 2011 or public network (WAN) 2051 on the other side, to input and output image information and device information.

A CPU 2001 is a controller for controlling the overall system. A RAM 2002 is a system work memory for the operation of the CPU 2001, and is also an image memory for temporarily storing image data. A ROM 2003 is a boot ROM storing a system boot program. An HDD 2004 is a nonvolatile storage medium for storing system software, image data, and the like.

An operation unit I/F 2006 is an interface unit to interface with an operation unit (UI) 2012 having a touch panel, and outputs image data to be displayed on the operation unit 2012 to the operation unit 2012. The operation unit I/F 2006 transmits information input by a user of this system from the operation unit 2012 to the CPU 2001. A network I/F 2010 connects to the LAN 2011 to input and output information. A modem 2050 connects to the public network 2051 to input and output information.

The devices described above are arranged on a system bus 2007.

An image bus I/F 2005 is a bus bridge which connects the system bus 2007 and an image bus 2008 for transmitting image data at high speed, and converts the data structure. The image bus 2008 comprises a PCI bus or IEEE 1394. The following devices are arranged on the image bus 2008.

A raster image processor (RIP) 2060 rasterizes a PDL code into a bitmap image. A device I/F 2020 connects the scanner 2070 as the image input device or the printer 2095 as the image output device and the controller unit 2000 to synchronously/asynchronously convert image data.

A scanner image processing unit 2080 corrects, processes, and edits input image data. A printer image processing unit 2090 performs a printer correction, resolution conversion, and the like for printout image data. An image rotation unit 2030 rotates image data. An image compression unit 2040 performs a JPEG compression/decompression process for multilevel image data and a JBIG, MMR or MH compression/decompression process for binary image data.

An IC card slot 2100 authenticates a user by an IC card medium. With this user authentication, a user can be specified upon job execution. When a proper PIN (Personal Identifier Number) code is input after inserting an IC card medium, a key used for encryption/decryption can be input/output. An encryption/decryption processing unit 2110 is a hardware accelerator board which performs encryption/decryption processing of data by using a key of the IC card slot 2100 or a key unique to the device. An OCR/OMR processing unit 2111 interprets text information or a two-dimensional bar code included in image data to a character code.

Figure 3:
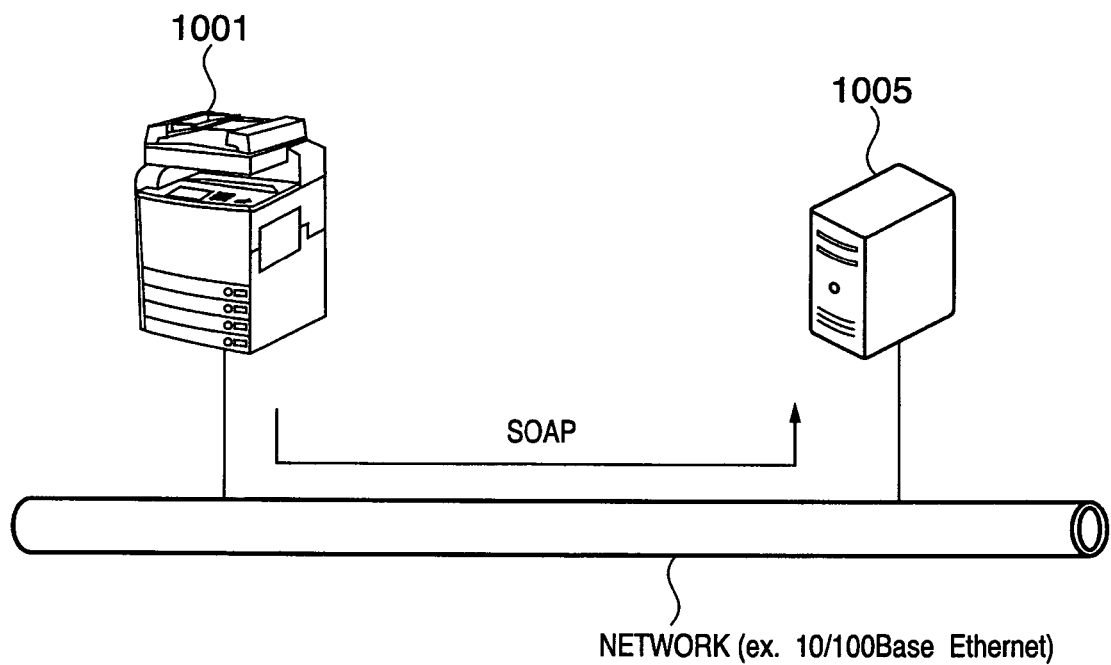
FIG. 3 is a diagram showing an arrangement example of a case in which a multifunctional peripheral 1001 according to the first embodiment of the present invention writes image data and job detailed information in a storage server 1005.

FIG. 3 is a diagram showing an arrangement example of a case in which a multifunctional peripheral 1001 according to the first embodiment of the present invention writes image data and job detailed information in a storage server 1005. In the arrangement example shown in FIG. 3, by using Ethernet®, SOAP (Simple Object Access Protocol) is used to store image data and job detailed information (log record) from the multifunctional peripheral 1001 to the storage server 1005. However, any other conventional protocol which can transmit data may be used. Encryption processing such as using SSL may be performed as needed. In addition, data in the storage server 1005 may be encrypted and stored.

In this embodiment, the multifunctional peripheral 1001 and storage server 1005 are separately arranged. However, the storage server 1005 may be included in the multifunctional peripheral 1001. In this case, image data related to a job executed by the multifunctional peripheral 1001 and detailed information (log record) of the job are stored in the specific area reserved in the HDD 2004. The setting information required to access the storage server 1005 of such arrangement is protected such that only the system administrator of the multifunctional peripheral 1001 can set.

FIG. 4 is a table showing an example of a log record to be stored in the storage server 1005 in the image processing system according to the first embodiment of the present invention. In FIG. 4, rows 4001 to 4022 represent respective items the explanations of which are shown in the item column. The tag name column shows the tag names for respective items for identifying data.

The row 4001 represents a job kind item which indicates the job kind such as COPY, FAX, or PDL. The tag name is [JobKind]. The row 4002 represents a job name item which indicates the job name of the executed job. The tag name is [JobName]. The row 4003 represents a job client name item which indicates the user name of the executed job. The tag name is [ClientName]. The row 4004 represents a text code information item which indicates the text code information used in this record. The tag name is [CharacterCode].

In FIG. 4, the row 4005 represents a section code item which indicates the number of the section to which the user belongs. The tag name is [SectionNo]. The row 4006 represents a job start time item which indicates the start time of the job. The tag name is [StartTime]. The row 4007 represents a job end time item which indicates the end time of the job. The tag name is [EndTime]. The row 4008 represents a job end result item which indicates the end result contents of the job such as OK or Canceled. The tag name is [Result]. The row 4009 represents a page count of one copy item which indicates the page count of the job. The tag name is [ResourceCount]. The row 4010 represents a copy count item which indicates the copy count set to be output. The tag name is [Copies].

In FIG. 4, the row 4011 represents a communication method item which indicates the kind of the communication method. The tag name is [Protocol]. The row 4012 represents a communication type item which indicates transmission or reception. The tag name is [ComType]. The row 4013 represents a used network number item which indicates the telephone number in use or the like. The tag name is [LineInfo]. The row 4014 represents a transmission/reception partner device address item which indicates the address or telephone number of the partner device. The tag name is [NoticeAddress]. The row 4015 represents a transmission/reception partner device name which indicates the name of the partner device of the job. The tag name is [ComAbbreviation].

In FIG. 4, the row 4016 represents a subject item which indicates the subject of an e-mail job or the like. The tag name is [Subject]. The row 4017 represents an image path name item which indicates the image storage destination of the image storage job. The tag name is [PathName]. The row 4018 represents a device name item which indicates the name assigned to the device. The tag name is [DeviceName]. The row 4019 represents a device serial number item which indicates the serial number unique to the device. The tag name is [DeviceSerialNo]. The row 4020 represents a device address item which indicates the IP address or the like of the device. The tag name is [DeviceAddress].

In FIG. 4, the row 4021 represents a document ID item which is used to specify the document handled by the job. A plurality of documents can be indicated by enumerating a plurality of document IDs. The tag name is [DocumentID]. A document ID is represented by a 32-digit ASCII character string made up of the "device serial number" (10-digit ASCII), "document generation time yymmddhhmmss" (12-digit ASCII), and "serial number incremented by the device for each job" (10-digit ASCII). The row 4022 represents a job detailed information item which indicates a note or the like. In this embodiment, "FORM-COMPOSITION" represents a form composition which composes for each page a form image registered in advance and an image of the submitted job, and outputs the composed image. The tag name is [JobInformation].

Note that the items represented by rows 4001 to 4022 may not be always used. The unused item is recorded as empty.

FIG. 5 is a table showing another example of the log record to be stored in the storage server 1005 in the image processing system according to the first embodiment of the present invention, as shown in FIG. 4. In FIG. 5, rows denoted by reference numerals 5001 to 5022 correspond to those denoted by reference numerals 4001 to 4022 in FIG. 4, respectively. The job kinds indicated by reference numerals 4001 and 5001 are different in examples 1 to 3 shown in FIGS. 4 and 5. As shown in FIGS. 4 and 5, items to be used differ in accordance with the job kind or the like. For example, in a FAX job of example 3, the telephone number of the own device is recorded as the used network number indicated by the row 5013 and the telephone number of the partner device is recorded as the transmission/reception partner device address indicated by the row 5014.

Figure 6:
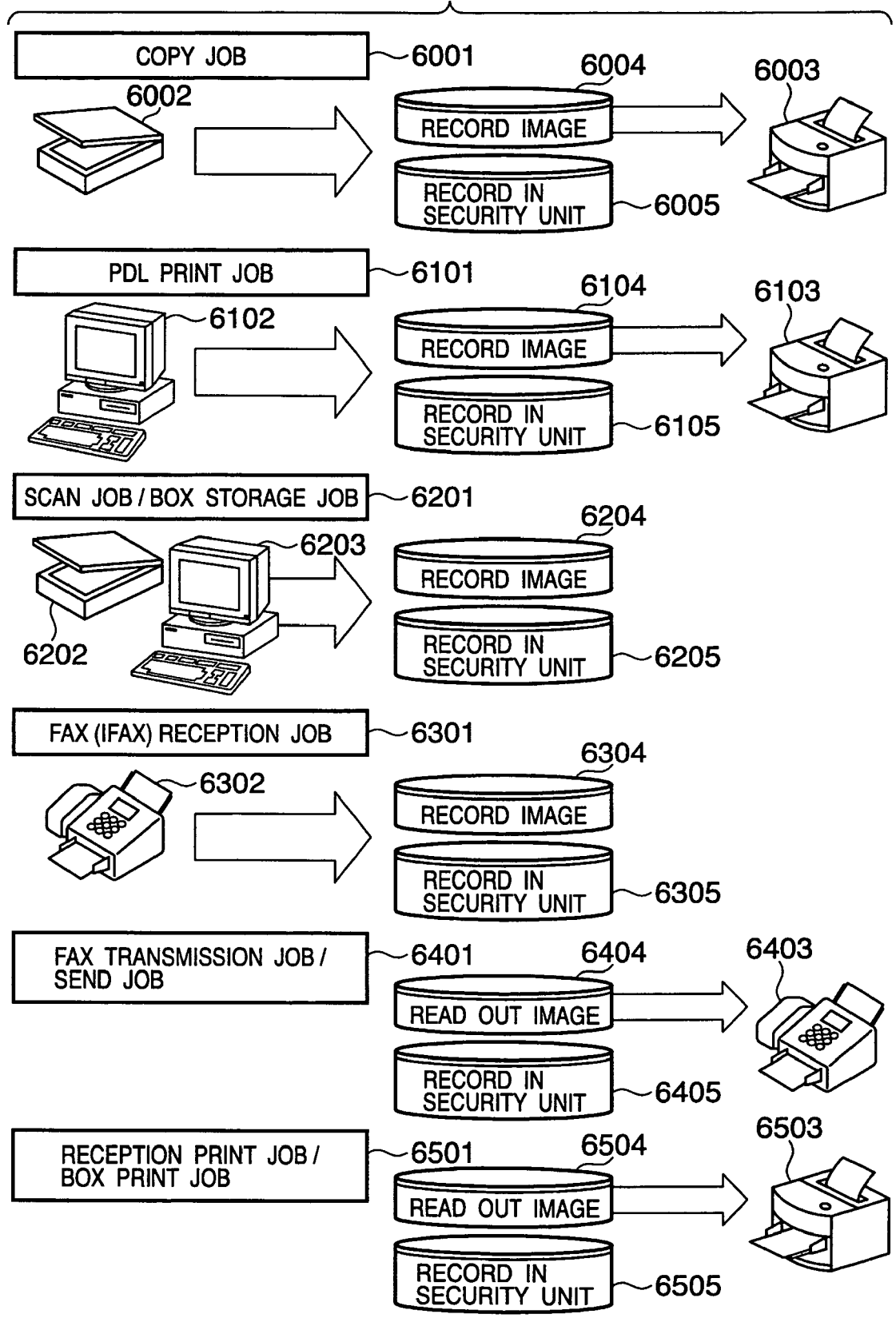
FIG. 6 is a diagram for explaining the data flow for each job kind when a security function according to the first embodiment of the present invention is valid.

FIG. 6 is a diagram for explaining the data flow for each job kind when a security function according to the first embodiment of the present invention is valid. In FIG. 6, reference numeral 6001 denotes a COPY job in which an image scanned by a scanner 6002 is temporarily recorded in an HDD 6004 and output to a printer 6003. Upon executing the job, the log record described using FIGS. 4 and 5 and the image scanned by the scanner 6002 are recorded in a security unit 6005. Note that the security unit referred herein is a generic term for the storage server 1005.

In FIG. 6, reference numeral 6101 denotes a PDL print job in which RIP (Raster Image Processing) is performed for PDL data transmitted from a host computer 6102 to generate an image. In the PDL print job, the image undergone RIP is temporarily stored in an HDD 6104 and output to a printer 6103. Upon executing the job, the log record described using FIGS. 4 and 5 and the image undergone RIP are recorded in a security unit 6105.

In FIG. 6, reference numeral 6201 denotes a SCAN job or BOX storage job in which an image transmitted from a scanner 6202 or an image obtained by performing RIP for PDL data transmitted from a host computer 6203 is recorded in an HDD 6204. Upon executing the job, the log record described using FIGS. 4 and 5 and the input image are recorded in a security unit 6205. The image recorded in the HDD 6204 in this job can be printed or transmitted later.

In FIG. 6, reference numeral 6301 denotes a FAX reception job or IFAX reception job in which an image transmitted from a partner device 6302 is recorded in an HDD 6304. Upon executing the job, the log record described using FIGS. 4 and 5 and the image received from the partner device 6302 are recorded in a security unit 6305. The image recorded in the HDD 6304 in this job can be printed or transmitted later.

In FIG. 6, reference numeral 6401 denotes a FAX/IFAX transmission job or SEND job in which the image stored in an HDD 6404 in the job 6201 or 6301 is read out and sent to a partner device 6403. Upon executing the job, the log record described using FIGS. 4 and 5 and the reference information of the image transmitted to the partner device 6403 are recorded in a security unit 6405. At this time, not the actual image but the reference information of the image previously recorded in the security unit 6205 or 6305 is recorded in the security unit 6405. This process avoids repeated recording of the same image, thereby increasing the processing speed and decreasing the recording amount. Note that the SEND job referred herein is a generic term for a job in which an image is transmitted using e-mail or a protocol such as FTP or SMB.

In FIG. 6, reference numeral 6501 denotes a reception print job or BOX print job in which the image stored in an HDD 6504 in the job 6201 or 6301 is read out and output to a printer 6503. Upon executing the job, the log record described using FIGS. 4 and 5 and the reference information of the image output to the printer 6503 are recorded in a security unit 6505. At this time, not the actual image but the reference information of the image previously recorded in the security unit 6205 or 6305 is recorded in the security unit 6505. This process avoids repeated recording of the same image, thereby increasing the processing speed and decreasing the recording amount.

The image processing system according to this embodiment can print a document received by a facsimile apparatus, transmit by a facsimile apparatus a scan image scanned in a SCAN job, or the like, by combining the jobs described above. A function of recording image data and a log record in the security unit upon executing jobs of various kinds by the multifunctional peripheral 1001 is referred to as a security function. The security function can be set valid/invalid by an operation of a specific user such as the administrator of the multifunctional peripheral 1001.

Figure 7:
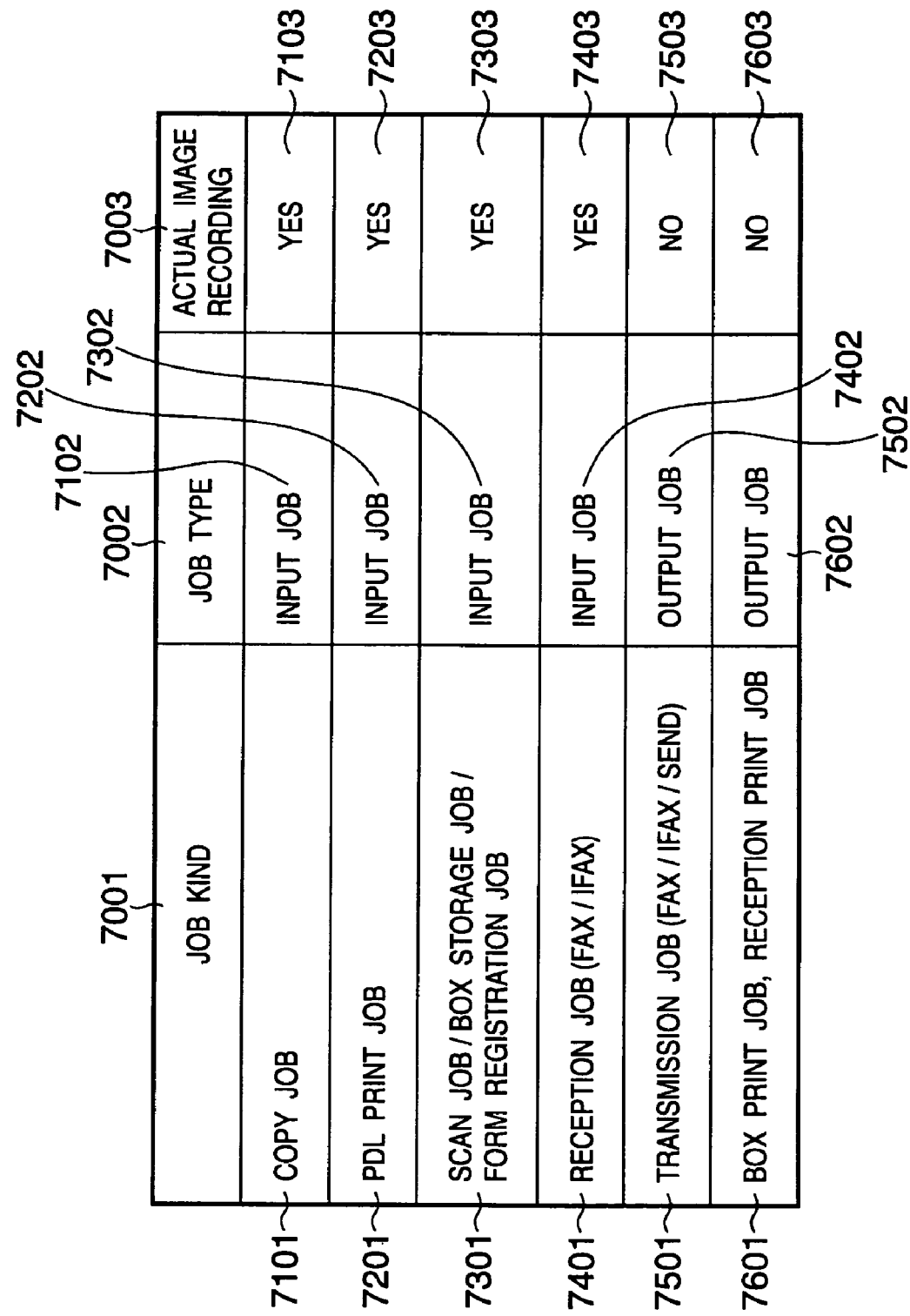
FIG. 7 is a table for explaining a method of storing an image in a security unit for each job kind according to the first embodiment of the present invention.

FIG. 7 is a table for explaining a method of storing an image in the security unit for each job kind according to the first embodiment of the present invention. As shown in FIG. 7, the column of a job kind 7001 indicates the job kind such as a COPY job or PDL print job. The column of a job type 7002 indicates the job type such as an input (job) or output (job) of an image. The column of an actual image recording 7003 indicates the setting of a job to record an actual image in the security unit or a job to record not the actual image but only the reference information of the actual image.

In FIG. 7, the job type 7002 of a COPY job 7101 indicates "input job" 7102 in which an image is input. Therefore, the actual image recording 7003 indicates "YES" 7103.

The job type 7002 of a PDL-PRINT job 7201 indicates "input job" 7202 in which an image is input. Therefore, the actual image recording 7003 indicates "YES" 7203.

The job type 7002 of a SCAN job/BOX storage job/form registration job 7301 indicates "input job" 7302 in which an image is input. Therefore, the actual image recording 7003 indicates "YES" 7303.

The job type 7002 of a reception job 7401 indicates "input job" 7402 in which an image is input. Therefore, the actual image recording 7003 indicates "YES" 7403.

The job type 7002 of a transmission job 7501 indicates "output job" 7502 in which an image is not input but only output. Therefore, the actual image recording 7003 indicates "NO" 7503. In the transmission job 7501, the reference information of the image is recorded instead of the actual image.

The job type 7002 of a BOX print job/reception print job 7601 indicates "output job" 7602 in which an image is not input but only output. Therefore, the actual image recording 7003 indicates "NO" 7603. In the BOX print job/reception print job 7601, the reference information of the image is recorded instead of the actual image.

Figure 8:
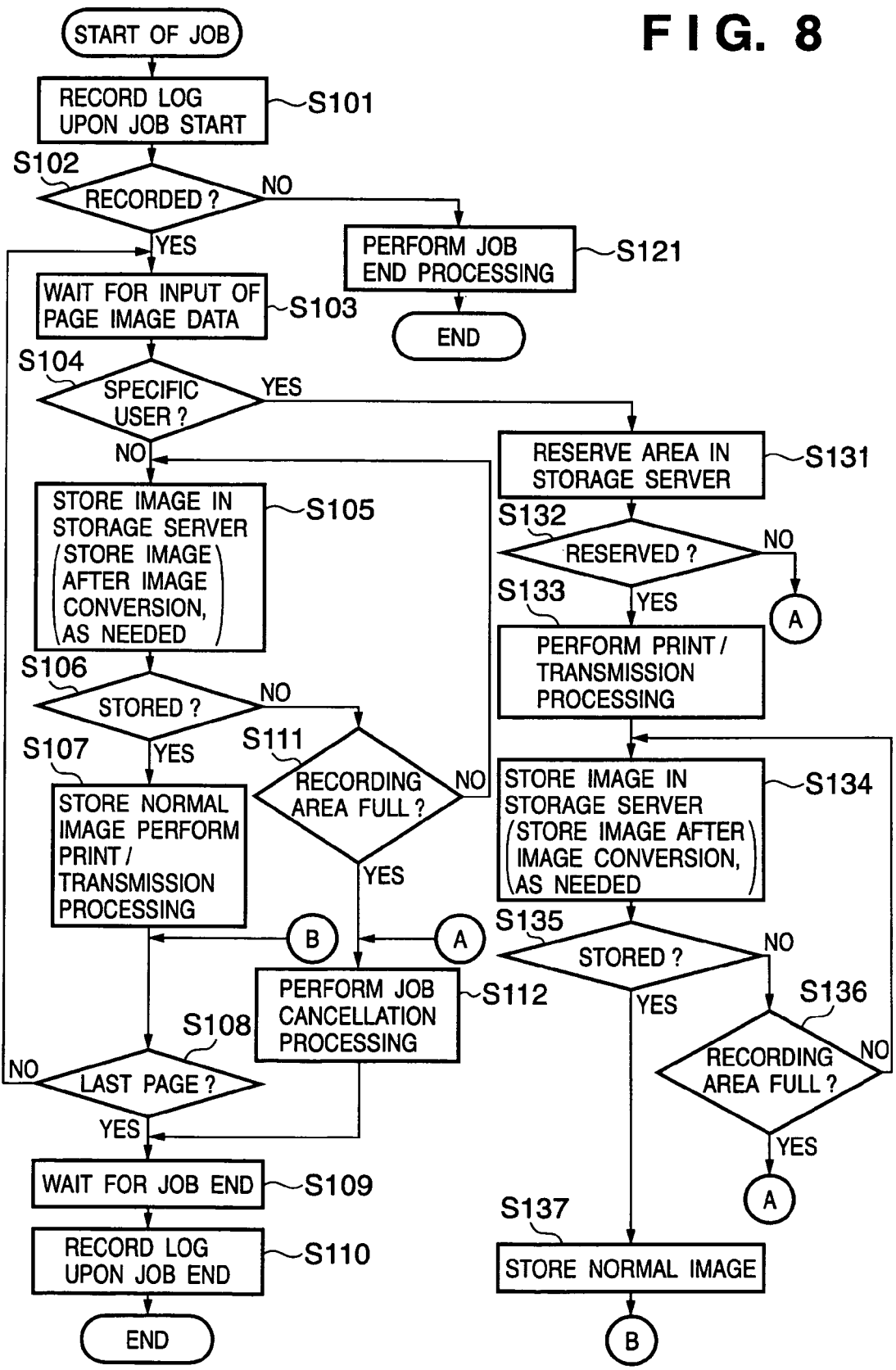
FIG. 8 is a flowchart for explaining processing of executing a job whose job type 7002 is "input job" in the image processing system according to the first embodiment of the present invention.

FIG. 8 is a flowchart for explaining processing of executing a job whose job type 7002 is "input job" in the image processing system according to the first embodiment of the present invention. First, when a job is started, a log upon starting the job is recorded (step S101). At this time, an area required for the log recording is reserved and, of a log record to be stored in the storage server 1005, items already defined at the time point of step S101 are written. Particularly, the document ID item represented by the row 4021 is important since it serves as the information to specify the images stored in the storage server 1005 as a document. Note that, since a job whose job type is "input job" is a new document, a new document ID is generated. The items undefined at this time point are not written respectively, but written upon ending the job. The area to write the items upon ending the job is also reserved in step S101.

Next, if the log is recorded is determined (step S102). If the log cannot be recorded or the required area cannot be reserved (NO), the flow advances to step S121 to perform job end processing without continuing the job execution. When the job end processing is completed, the flow is terminated. Alternatively, if the required area reservation and log recording are determined to be properly performed (YES) in step S102, the flow advances to step S103.

In step S103, input of image data is waited. If an image for one page is input, the flow advances to step S104. Note that, in the case of a job whose job type 7002 is "output job", input of the image in step S103 is replaced with readout of the image from the HDD 2004.

In step S104, it is determined if a person executing the job is a specific user. As a result of a user authentication by the IC card slot 2100 or the like, if the person is determined to be a privileged user, system administrator, section manager, or the like who has been set as a specific user in advance (YES), the flow advances to step S131. If the person is determined to be not a specific user but a general user (NO), the flow advances to step S105. Assume that the user authentication has been already performed before this flowchart starts, and the user who operates the multifunctional peripheral 1001 has been specified.

In step S105, the image input in step S103 is stored in the storage server 1005. At this time, an image ID which is unique to each page is assigned. In addition, a resolution conversion or a color mode conversion to convert a color image into a monochrome image is performed, as needed, to compress the size of the image data. Note that the image ID is represented by, e.g., a 32-digit ASCII character string made up of the "device serial number" (10-digit ASCII), "image recording time yymmddhhmmss" (12-digit ASCII), and "serial number incremented by the device for each image recording" (10-digit ASCII).

Next, it is determined if the image data for one page input in step S103 is stored in the storage server 1005 (step S106). If the image data is determined to be stored (YES), the flow advances to step S107. Otherwise (NO), the flow advances to step S111. In step S111, it is determined if the area in which the image is written in step S105 is full. If the area is determined to be full (YES), since the writing will not succeed, the flow advances to step S112. Otherwise (NO), the flow returns to step S105 to perform the write processing described above again. Note that, when the determination in step S106 does not become "YES" even after a processing loop of step S105→step S106 (NO)→step S111 (NO)→step S105 is repeated for a predetermined times, the storage in the storage server may be determined to have failed, and the flow may skip to job cancellation processing in step S112.

In step S112, job cancellation processing is performed, and then the flow advances to step S109. With this processing, transmission or printing of the image which is not stored in the storage server 1005 can be prevented. Note that, if the image data for one page input in step S103 remains in the HDD 2004 or RAM 2002, the data is erased. Reliable physical erasure may be done by overwriting random data once or more times, as needed.

In step S107, the image data input in step S103 is stored in the HDD 2004 to execute the job. In the case of a BOX storage job, SCAN job, or reception job, the process is completed only by storing the image in the HDD 2004. In the case of a COPY job or PDL print job, however, the image data is read out from the HDD 2004 and output to the printer 2095. In the case of a transmission job, transmission processing using the network I/F 2010 or modem 2050 is performed.

Since the job is executed after the image is ensured to be stored in the storage server 1005 in step S106, the image to be printed or transmitted is always stored in the security unit. Even if the image data processed in the job is confidential image data and is found to have been leaked, this arrangement helps track down the leakage source by investigating the log record stored in the security unit later. Upon completion of processing in step S107, the flow advances to step S108. In step S108, it is determined if the image received in step S103 is the last page. If the image is determined to be the last page (YES), the flow advances to step S109. Otherwise (NO), the flow returns to step S103 to wait for the next image input.

In step S109, job end is waited. Subsequently, log recording processing about the item which was undefined at the time point of step S101, i.e., the job end result 4008 or the like, is performed in the storage server 1005 (step S110). Upon completion of the log recording in step S110, the flow is terminated.

In step S131, an area for the image for one page to be written is reserved in the storage server 1005. Then, it is determined if the area for storing the image for one page is reserved (step S132). If the area is determined to be reserved (YES), the flow advances to step S133. Otherwise (NO), the flow advances to step S112 to perform Job cancellation processing.

In step S133, print/transmission processing in accordance with the job is performed. For example, in the case of a COPY job or PDL print job, printout processing to the printer 2095 is performed. In the case of a transmission job, transmission processing using the network I/F 2010 or modem 2050 is performed.

Next, the image input in step S103 is stored in the storage server 1005 (step S134). At this time, an image ID which is unique to each page is assigned. In addition, a resolution conversion or a color mode conversion to convert a color image into a monochrome image is performed, as needed, to compress the size of the image data. Note that the image ID is represented by, e.g., a 32-digit ASCII character string made up of the "device serial number" (10-digit ASCII), "image recording time yymmddhhmmss" (12-digit ASCII), and "serial number incremented by the device for each image recording" (10-digit ASCII).

In step S135, it is determined if the image is stored in the storage server 1005. If the image is determined to be stored (YES), the flow advances to step S137. Otherwise (NO), the flow advances to step S136. In step S136, it is determined if the area in which the image is written in step S134 is full. If it is determined not to be full (NO), the flow returns to step S134 to perform the write processing again. Otherwise (YES), since the writing will not succeed, the flow advances to step S112 to perform job cancellation processing.

When the flow advances from step S136 to step S112, the image printed or transmitted is not recorded in the storage server 1005. This becomes a security hole. In this embodiment, however, job productivity may be taken in account rather than little possibility of a security hole, in the case of a secured user who has been specially registered in advance. That is, print/transmission processing is given higher priority than image write processing to the storage server.

In step S137, the image input in step S103 is stored in the HDD 2004. Upon completion of the storage, the flow advances to step S108.

In this embodiment, the operation of the input job has been described. In the case of an output job, as described using FIG. 7, since the reference information of an image is recorded instead of the actual image, whether image write in the storage server 1005 for each image is performed prior to print/transmission processing or not is not a problem. Therefore, in an output job, not the actual image but the reference information of a document is recorded by recording, as the log upon starting the job, the same ID as the document ID 4021 which is stored in the storage server 1005 in the input job previously executed to process the same document as that of this output job. In this manner, the image processed in the output job can be specified.

Note that, in the case of an output job, the job may be executed after it is determined that the image data specified by the reference information recorded in the log record is stored in the storage server 1005. In this case, if the image data specified by the reference information is not stored in the storage server, the job is canceled. In an output job, only a job in which the image data specified by the reference information is completely stored in the storage server can be executed. In this manner, a log record can be more reliably recorded in the storage server.

In the examples described above, the timing of image write in the storage server 1005 is changed in accordance with the user. However, an image may be written first in the storage server 1005 for all users. With this arrangement, although the processing speed may be sacrificed more or less, the log recording taking account of security can be uniformly performed for all users.

Figure 9:
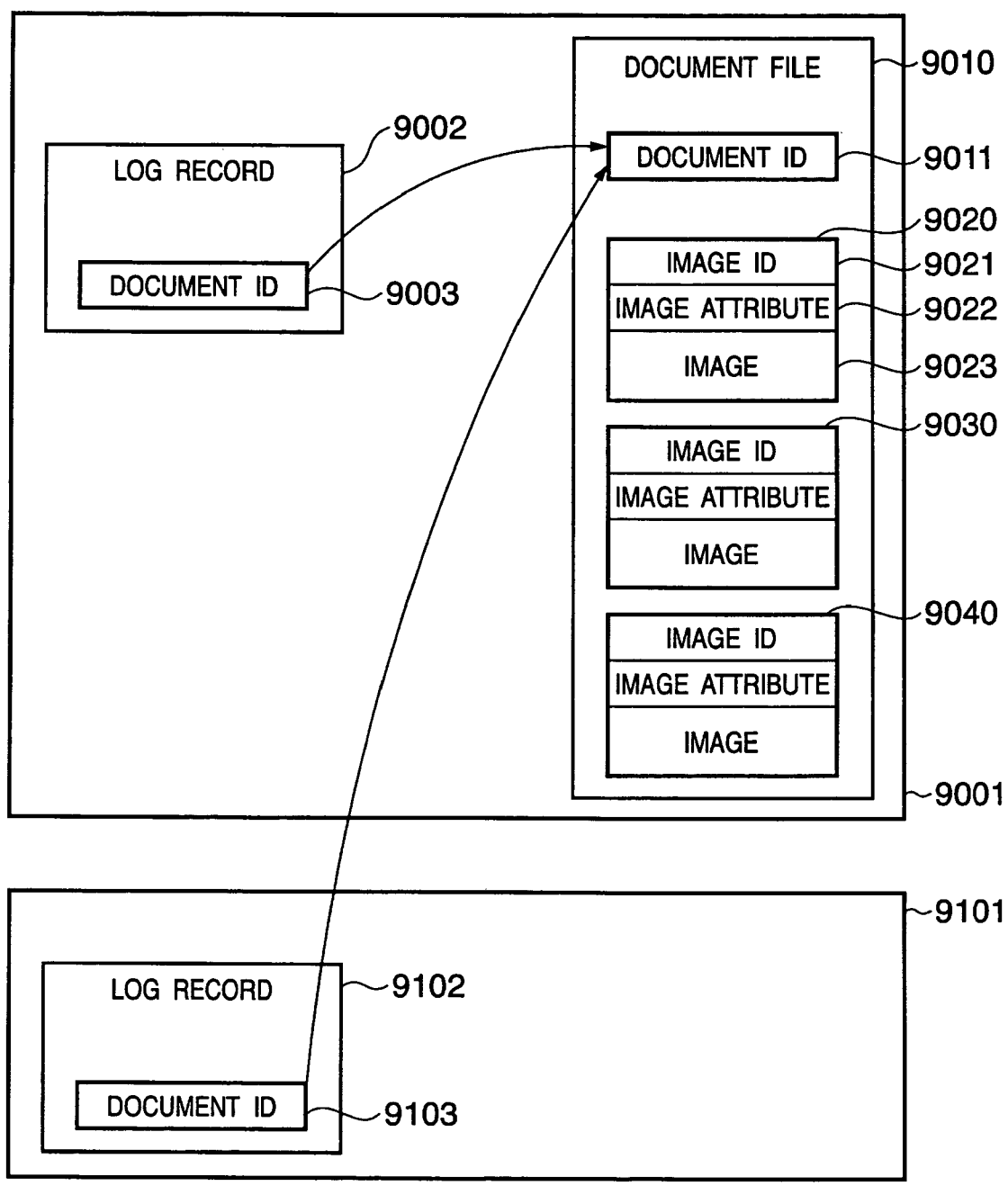
FIG. 9 is a view for explaining an example of writing in the storage server 1005 in the image processing system according to the first embodiment of the present invention.

FIG. 9 is a view for explaining an example of writing in the storage server 1005 in the image processing system according to the first embodiment of the present invention. In FIG. 9, reference numeral 9001 denotes a job whose job type 7002 is "input job" (e.g., the BOX storage job 7301). Reference numeral 9101 denotes a job whose job type 7002 is "output job" (e.g., a BOX print job 7601). That is, the output job 9101 is for outputting an image input in the input job 9001.

In FIG. 9, a log record 9002 and document file 9010 are recorded in the storage server 1005 in the input job 9001. The log record 9002 has the items described using FIG. 4, including a document ID 9003. The document file 9010 includes a document ID 9011 and image data 9020, 9030, and 9040. The document file 9010 and log record 9002 are linked to each other by the document IDs 9011 and 9003 to represent the correspondence relationship.

In FIG. 9, the image data 9020 is written in the storage server 1005 in step S105 and includes an image ID 9021, image attribute 9022, and image 9023. An image ID is unique to each actual image. The image attribute 9022 is the image format and the like of the image 9023. The image 9023 is the image itself. In the storage server 1005, one document consists of one file and can include a plurality of pages (images). One document has one unique document ID 9011.

In FIG. 9, a log record 9102 is recorded in the storage server 1005 in an output job 9101. In an output job, no document file is to be recorded. A document which is output in the output job 9101 is indicated by recording as a document ID 9103 the same value as that of the document ID 9011 which was recorded in the previously executed input job. In this method, since no image is recorded in the storage server 1005 upon output processing, the recording amount can be decreased and the job processing speed can be prevented from decreasing.

Figure 10A:
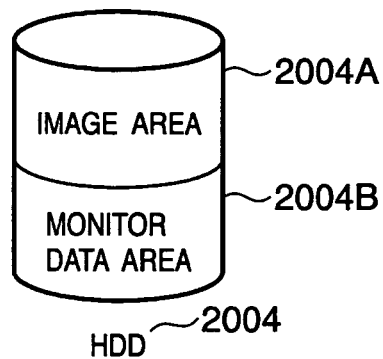
FIGS. 10A to 10C show diagrams for explaining detailed storage areas of an HDD 2004 and data to be stored therein.
Figure 10B:
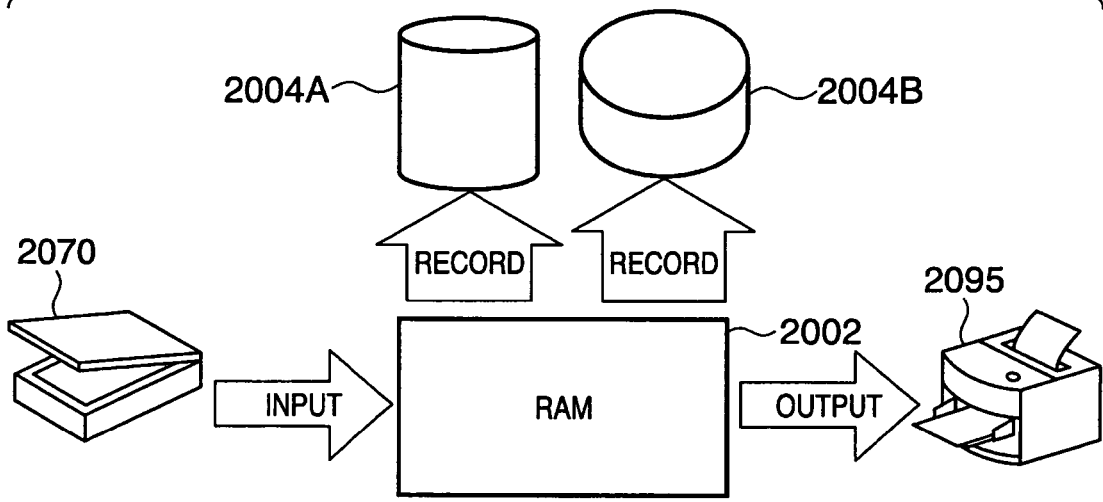
Figure 10C:
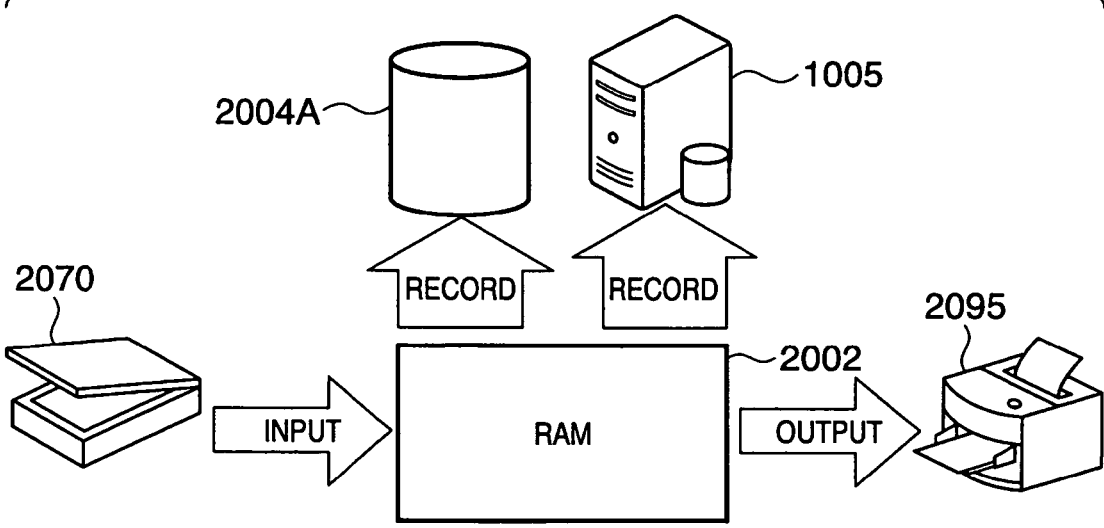

FIGS. 10A to 10C show diagrams for explaining detailed storage areas of the HDD 2004 and data to be stored therein. FIG. 10A is a diagram showing the detailed arrangement of the HDD 2004. The multifunctional peripheral 1010 incorporating the storage server 1005 has two areas: an area 2004A for storing a general image and an area 2004B for storing monitor data.

FIG. 10B is a diagram showing a case in which the COPY job 6001 is executed in the multifunctional peripheral 1010. An image input from the scanner 2070 is temporarily stored in the RAM 2002. When the security function is invalid, the image is read out from the RAM 2002 and recorded in the HDD 2004A while being output to the printer 2095. In this manner, conventionally, the multifunctional peripheral outputs image data to the printer 2095 before the data is completely stored in the HDD 2004, thereby increasing the speed of job execution. On the other hand, when the security function is valid, monitor data (image to be stored in the storage server and log record as associated information of the image) is written in the HDD 2004B, and then the image is recorded in the HDD 2004A to execute the job while being output to the printer 2095. In this manner, an image to be printed is always stored in the HDD 2004B before being printed. Conventionally, in order to increase the speed of a copy operation, write of the input image in the RAM 2002 and read of the output image from the RAM 2002 are simultaneously preformed. When the security function is valid, this conventional operation is prohibited.

Assume that the security function is invalid, and image input to the RAM 2002 and image output to the printer 2095 are asynchronously preformed. In this case, if an input image remains in the RAM 2002 at the timing of output to the printer 2095, the image is not read out from the HDD 2004A, but the image remaining in the RAM 2002 is directly printed out. While the security function is valid, image write in the HDD 2004B has higher priority. Therefore, even when the image remains in the RAM 2002, read of the image in the RAM 2004 to output it to the printer 2095 is permitted only when the condition that the image has been written in the HDD 2004B is satisfied.

In addition, assume that the security function is invalid, and an input image and output image can be almost synchronously processed. In this case, in order to increase the speed of print operation, paper feed processing to feed a paper sheet in a cassette in the printer 2095 is started before an image is input from the scanner 2070 to the RAM 2002. However, while the security function is valid, such paper feed processing is prohibited, and paper feed from the cassette is controlled to start after monitor data is completely stored in the HDD 2004B.

FIG. 10C is a diagram showing the COPY job 6001 when executed in the multifunctional peripheral 1001. The difference of the processing in FIG. 10C from that in FIG. 10B is that monitor data is stored in the storage server 1005 in stead of in the HDD 2004B. As long as write in the storage server 1005 is not complete, the image remaining in the RAM 2002 cannot be used for printing purpose or the like. This point is same as that in FIG. 10B.

As has been described above, when the security function of recording the image and the log information of the job executed by a user is valid, image output such as print or transmission executed before the data required for the security function is completely written is prohibited. With this arrangement, an image to be output is completely recorded in a security recording device in safety. Even when the security function is valid, writing data required for the security function is not given priority in the case of a specific user who has been registered in advance. With this arrangement, a drop in the speed of print or transmission processing operation can be prevented, thereby realizing improvements in two factors, i.e., security and performance, with good balance.

That is, in the image processing system according this embodiment, an image input or output by the image processing apparatus and the associated information of the image can be completely recorded in the security unit. In addition, for a specific user determined to have less risk of information leakage, the image input/output speed of the image processing apparatus can be given higher priority than completely recording an image in the security unit.

Second Embodiment

A basic system arrangement diagram and basic system block diagram, the arrangement of a security unit, recording contents of a log record, flowchart of data processing of each job kind, and image storage method according to the second embodiment of the present invention are the same as those shown in FIGS. 1 to 10 according to the first embodiment described above, and descriptions thereof will be omitted.

Figure 11:
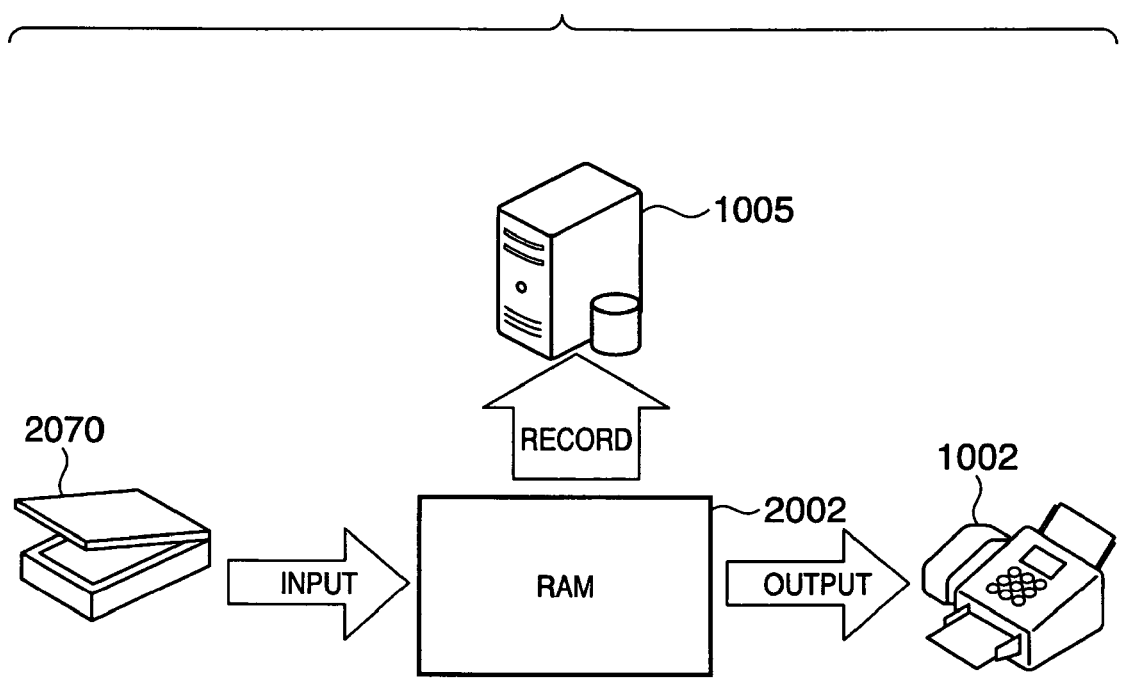
FIG. 11 is a block diagram showing a state in which a FAX direct transmission is executed in a multifunctional peripheral 1001 according to the second embodiment of the preset invention.

FIG. 11 is a block diagram showing a state in which a FAX direct transmission is executed in a multifunctional peripheral 1001 according to the second embodiment of the preset invention. FAX transmission includes two types of transmission method, i.e., memory transmission and direct transmission. Memory transmission is a method of temporarily storing an image read out from a scanner 2070 or the like in an HDD 2004 or the like, and then transmitting the image. Memory transmission has a merit of shortening the transmission time. However, if the image data to be transmitted cannot be completely stored in a recording device, the job is canceled. Direct transmission is a method of temporarily storing an image read out from the scanner 2070 or the like in a RAM 2002 without using the recording device such as the HDD 2004, and transmitting the image. In direct transmission, an image can be transmitted even when the HDD 2004 is full, but the transmission time increases.

In FIG. 11, an image input from the scanner 2070 is temporarily stored in the RAM 2002. When a security function is invalid, transmission processing to a facsimile apparatus 1002 is preformed. That is, direct transmission is available in this case. On the other hand, when the security function is valid, monitor data (image and its associated information) is written in a storage server 1005, and then the image is transmitted to the facsimile apparatus 1002. In this manner, the image to be transmitted is always stored in the storage server 1005 before its transmission. Therefore, when the security function is valid, direct transmission is prohibited.

When a transmission job for a plurality of pages is written in the storage server 1005 using the above method, monitor data is written in the storage server 1005 during the intervals between transmissions of respective pages. If the write process takes time, a communication timeout with respect to the facsimile apparatus 1002 occurs, and the job may not succeed. For this reason, a function restriction needs to be performed according to the flowchart described below when the security function is valid.

Figure 12:
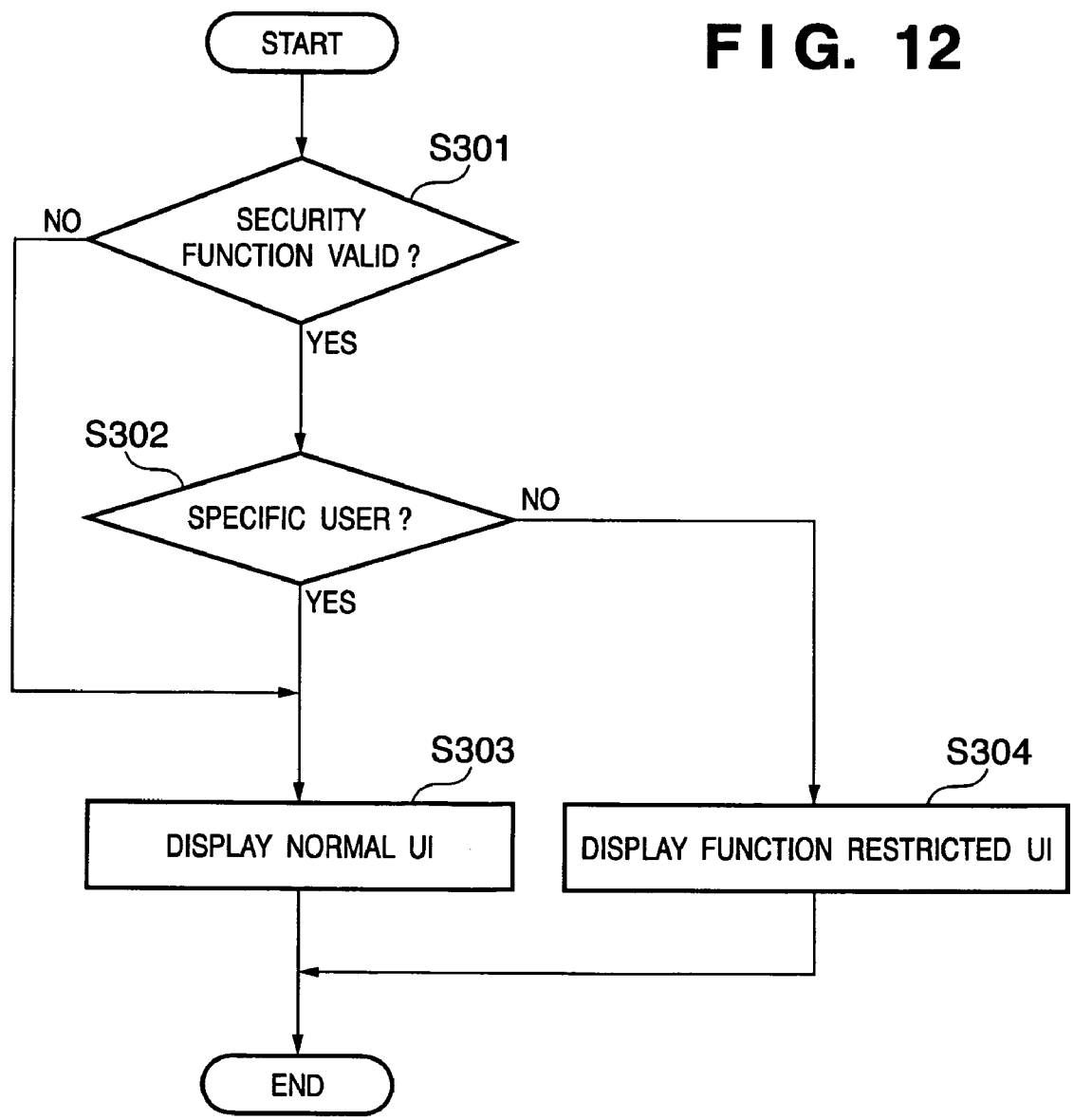
FIG. 12 is a flowchart for explaining window display processing in an image processing system according to the second embodiment of the present invention.

FIG. 12 is a flowchart for explaining window display processing in an image processing system according to the second embodiment of the present invention. This processing is performed when a window is displayed in an operation unit 2012.

First, it is determined if the security function is valid (step S301). If the security function is valid, the flow advances to step S302. Otherwise, the flow advances to step S303. In step S302, as a result of a user authentication by the IC card slot 2100 or the like, if the person is determined to be a privileged user, system administrator, section manager, or the like set as a specific user in advance (YES), the flow advances to step S303. If the user is determined to be a general user who is not specified, or a user who is not authenticated (NO), the flow advances to step S304.

In step S303, a UI window of a general operation function is displayed. When the window is displayed, the flow is terminated. In step S304, when the security function is valid, e.g., in the case of direct transmission described using FIG. 11, a function requiring real time processing such as direct transmission which may cause a problem is, e.g., shaded so as not to be selected. Then, the window in which the function is shaded is displayed. When the window is displayed, the flow is terminated.

As has been described above, when the security function of recording the image and the log information of the job executed by a user is valid, display of the function which may cause a problem is restricted. This can prevent execution of a function which may cause a problem, in advance. Even while the security function is valid, the function restriction is not set for a specific user registered in advance. With this arrangement, a user who has been determined to pose no risk can normally operate the apparatus without the restriction.

As has been described above, in the image processing system according to this embodiment, when recording in the security unit upon executing a real time processing function, an error caused by the timeout of real time processing can be prevented. In addition, the real time processing function which is prohibited in order to record data in the security unit can be used only by a specific user who needs the real time processing function.

Other Embodiment

The preferred embodiments have been described in detail. However, the present invention can be implemented as an embodiment such as a system, apparatus, method, program, or storage medium (recording medium). More specifically, the present invention can be applied to a system constituted by a plurality of devices, or to an apparatus comprising a single device.

Note that the present invention can be implemented even by directly or remotely supplying a software program (program corresponding to the flowcharts shown in drawings in the embodiments) for implementing the functions of the above-described embodiments to a system or an apparatus, and causing the computer of the system or the apparatus to read out and execute the supplied program codes.

Accordingly, the program codes installed in the computer to implement the functional processing of the present invention implements the present invention by themselves. That is, the computer program itself for implementing the functional processing of the present invention is included in the present invention.

In this case, the program may be in a form of an object code, a program executed by an interpreter, script data supplied to an OS, or the like as long as it has a program function.

As a storage medium for supplying the program, a floppy® disk, a hard disk, an optical disk, a magnetooptical disk, an MO, a CD-ROM, a CD-R, a CD-RW, a magnetic tape, a nonvolatile memory card, a ROM, a DVD (DVD-ROM, DVD-R), or the like can be used.

As another method of supplying the program, the program can also be supplied by connecting to a homepage of the Internet by using a browser of a client computer, and downloading the computer program itself of the present invention or a compressed file including an automatic installation function from the homepage to a recording medium such as a hard disk. It is also possible to divide the program codes forming the program of the present invention into a plurality of files, and download the individual files from different homepages. That is, the present invention includes a WWW server which allows a plurality of users to download a program file for implementing the functional processing of the present invention by a computer.

Furthermore, the program of the present invention can also be encrypted and distributed to users by storing the program in a storage medium such as a CD-ROM. A user who has cleared predetermined conditions is allowed to download key information for decryption from a homepage across the Internet. The encrypted program is executed by using the key information, and the functional processing of the present invention is implemented by installing the program in the computer.

The functions of the above-described embodiments are implemented not only when the readout program is executed by the computer but also when the OS running on the computer performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

According to the present invention, even when failures of various types occur, input/output image data and its associated information can be completely recorded in a predetermined unit so that a proper track down can be performed later.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-170049, filed Jun. 9, 2005, which is hereby incorporated by reference herein in its entirety.

What is claimed is:

1. An image processing system comprising:
an execution unit constructed to execute a job in which image data is printed;
a storage unit constructed to store, in order to monitor the image data of the job to be executed by the execution unit and log information of the job, the image data and the log information;
a selection unit constructed to select validation or invalidation of storage processing by the storage unit; and
a sheet feed prohibition unit constructed to prohibit start of, before the image data to be printed is stored in the storage unit, feeding a sheet on which an image based on the image data is to be printed, when the selection unit selects validation of storage processing by the storage unit.

2. An image processing method comprising:
an execution step of executing a job in which image data is printed;

a storage step of storing, in order to monitor the image data of the job to be executed in the execution step and log information of the job, the image data and the log information;

a selection step of selecting validation or invalidation of storage processing in the storage step; and a sheet feed prohibition step of prohibiting start of, before the image data to be printed is stored in the storage step, feeding a sheet on which an image based on the image data is to be printed, when validation of storage processing in the storage step is selected in the selection step.

3. A computer readable storage medium storing an image processing program for causing a computer to execute an image processing method, the image processing method comprising:

an execution step of executing a job in which image data is printed;

a storage step of storing, in order to monitor the image data of the job to be executed in the execution step and log information of the job, the image data and the log information;

a selection step of selecting validation or invalidation of storage processing in the storage step; and a sheet paper feed prohibition step of prohibiting start of, before the image data to be printed is stored in the storage step, feeding a sheet on which an image based on the image data is to be printed, when validation of storage processing in the storage step is selected in the selection step.

* * * * *